United States Patent
Caruba et al.

(10) Patent No.: US 6,921,904 B2
(45) Date of Patent: Jul. 26, 2005

(54) SOLID STATE GAMMA CAMERA MODULE AND INTEGRATED THERMAL MANAGEMENT METHOD THEREOF

(75) Inventors: James F. Caruba, Bartlett, IL (US); George W. Dailey, Glen Ellyn, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 210 days.

(21) Appl. No.: 10/131,253

(22) Filed: Apr. 25, 2002

(65) Prior Publication Data

US 2004/0056205 A1 Mar. 25, 2004

(51) Int. Cl.⁷ ................................................. G01T 1/24
(52) U.S. Cl. ................................................. 250/370.15
(58) Field of Search ..................................... 250/370.15

(56) References Cited

U.S. PATENT DOCUMENTS

| | | |
|---|---|---|
| 4,292,645 A | 9/1981 | Schlosser et al. |
| 5,132,542 A | 7/1992 | Bassalleck et al. |
| 6,465,790 B1 * | 10/2002 | Monnet et al. ........ 250/370.09 |
| 6,510,195 B1 * | 1/2003 | Chappo et al. ................ 378/19 |
| 6,621,084 B1 * | 9/2003 | Amrami et al. ........ 250/379.09 |

* cited by examiner

Primary Examiner—Constatine Hannaher

(57) ABSTRACT

A solid state gamma camera module and integrated thermal management method thereof includes a printed circuit board having a first thermal layer and a second thermal layer. The first thermal layer is thermally and/or electrically bonded to the second thermal layer. A semiconductor detector module having the temperature sensitive material electrically communicates with the second thermal layer. A plurality of the integrated circuits each having a bottom metal layer and wire bonds are electrically connected to the first thermal layer. A cover is electrically and thermally bonded to the first thermal layer and covers the plurality of integrated circuits. The first thermal layer extracts heat from the integrated circuits by direct interface to the bottom metal layer (or the second thermal layer), and the second thermal layer extracts heat from an integrated circuit (IC) interconnect. The IC interconnect can be through a wire bond, die bond, direct solder flip chip attachment or the like. Accordingly, heat generated by the integrated circuits is removed while heat flow to the temperature sensitive material is reduced.

24 Claims, 3 Drawing Sheets

SOLID STATE GAMMA CAMERA MODULE AND INTEGRATED THERMAL MANAGEMENT METHOD THEREOF

BACKGROUND OF THE INVENTION

1. Field of the Invention

The present invention relates generally to a solid state gamma camera module and an integrated thermal management method, and more particularly to a module and method for removing heat generated by integrated circuits while reducing heat flow to temperature sensitive CZT material.

2. Description of the Background Art

Radiographic imaging is the detection of radiation from a distributed radiation field in order to form an image. By detecting the amount of radiation emanating from a test subject, the resultant image may give a representative view of the structure of the test subject.

Radiographic imaging typically employs gamma rays. Gamma rays are a form of radiation that is emitted by excited atomic nuclei during the process of passing to a lower excitation state. Gamma radiation is commonly used for medical imaging, and is capable of passing through soft tissue and bone. Gamma radiation may be provided by a radiopharmaceutical, such as thallium or technetium, for example, that is administered to the patient. The radiopharmaceutical travels through the patient's body and may be chosen to be absorbed or retained by an organ of interest. The radiopharmaceutical generates a predictable emission of gamma rays through the patient's body that can be detected and used to create an image.

A radiographic imaging device may be used to detect radiation emanating from the patient and may be used to form an image or images for viewing and diagnosis. Conventional gamma cameras utilize a scintillation crystal (usually made of sodium iodide) which absorbs the gamma photon emissions and emits light photons (or light events) in response to the gamma absorption. An array of photodetectors, such as photomultiplier tubes, is positioned adjacent to the crystal. The photomultiplier tubes receive the light photons from the crystal and produce electrical signals having amplitudes corresponding to the amount of light photons received. The electrical signals from the photomultiplier tubes are applied to position computing circuitry, wherein the location of the light event is determined, and the event location is then stored in a memory, from which an image of the radiation field can be displayed or printed.

Also known in the art are solid-state nuclear imaging cameras, see, e.g., U.S. Pat. Nos. 4,292,645 and 5,132,542. Such cameras use solid-state or semiconductor detector arrays in place of the scintillation crystal and photomultiplier tubes. In a solid-state camera, gamma rays are absorbed in a semiconductor material, creating electron-hole pairs in the semiconductor material. A bias voltage across the semiconductor detector causes the electrons and holes to form an electric current through the semiconductor material. The currents are converted by associated circuitry into electrical signals, which are processed to determine the location and magnitude of the gamma ray absorption event.

While solid-state cameras offer potential benefits over the conventional scintillation crystal cameras in terms of reduced weight, improved resolution, improved uniformity and increased imaging area, the use of such cameras has presented its own set of problems. In particular, early solid-state detectors made of germanium had to be cryogenically cooled to achieve acceptable performance.

Semiconductor detectors made of cadmium zinc telluride (CZT) have recently been proposed for use in solid-state gamma cameras. Such detectors may be operated at room temperature.

A number of radiographic sensor device modules may be tiled in an array to form a detector head. The detector head may be formed such that the radiographic sensor modules are individually detachable for maintenance, adjustment, etc.

Power dissipation of wire bonded/die bonded integrated circuits produces undesirable heat in a radiographic sensor device (i.e., heat generated when integrated circuits are die bonded). This leads to several problems in a radiographic sensor device. For example, the heat may degrade the sensor efficiency. A sensor at elevated temperature is not as sensitive and is less able to detect extreme high or low levels of radiation from the subject. In addition, sensor heating may cause mechanical defects, such as warping or expansion and contraction of the sensor material, with resulting cracking or other mechanical failures.

Conventional methods for extracting heat use one or more of the following means of thermal conduction: (1) air, (2) conformal integrated circuit coating, (3) thermal connection point to the top surface of the integrated circuit, or (4) printed circuit board (PCB) material. These methods, however, have high thermal resistance between the integrated circuits and a heat sink interface, thereby increasing the CZT operating temperature and associated bulk leakage current.

Therefore, there remains a need for an improved solid state gamma camera module and integrated thermal management method that provides a low thermal resistance path between the integrated circuits and a heat-sink interface while reducing the heat conduction path to temperature sensitive CZT material.

SUMMARY OF THE INVENTION

Accordingly, it is an object of the present invention to provide a low resistance thermal path for integrated circuit heat transfer out of the radiographic sensor module.

It is another object of the present invention to minimize heat flow to temperature sensitive CZT material.

Another object of the present invention is to provide a means of negative bias to the integrated circuit bulk.

Yet another object of the present invention is to provide a shielded semi-hermetic thermally conductive cover.

It is yet another object of the present invention to provide physical protection for the integrated circuits.

Another object of the present invention is to provide a thermal interface point for an external heat sink.

It is another object of the present invention to allow the wire-bonds and integrated circuit top layer to be free from conformal materials thereby minimizing strays and leakage.

According to one aspect of the present invention, there is provided a solid state gamma camera module for providing a low thermal resistance path between integrated circuits and a heat sink interface while reducing a heat conduction path to temperature sensitive material. The module comprises a printed circuit board having a first thermal layer and a second thermal layer. The first thermal layer is thermally and/or electrically bonded to the second thermal layer. There is also provided a semiconductor detector module having the temperature sensitive material. The detector module electrically communicates with the second thermal layer. Further provided is a plurality of the integrated circuits each having a bottom metal layer and wire bonds. The integrated circuits are electrically connected to the first thermal layer. A covering means electrically and thermally bonded to the first thermal layer for covering the plurality of integrated circuits is also provided. The first thermal layer extracts heat from the integrated circuits by direct interface to the bottom metal layer and the second thermal layer extracts heat from an integrated circuit (IC) interconnect (i.e., a direct solder flip chip attachment or wire bonds).

According to another aspect of the present invention, there is provided an integrated thermal management method of providing a low thermal resistance path between integrated circuits and a heat sink interface while reducing a heat conduction path to temperature sensitive material. The method comprises the step of providing a printed circuit board with a first thermal layer and a second thermal layer. The first thermal layer is thermally and/or electrically bonded to the second thermal layer. The method further comprises the step of providing a semiconductor detector module with the temperature sensitive material. The detector module electrically communicates with the second thermal layer. The method further comprises the step of providing a plurality of the integrated circuits with a bottom metal layer and wire bonds. The integrated circuits are electrically connected to the first thermal layer. The method further comprises the step of providing covering means electrically and thermally bonded to the first thermal layer, with the covering means covering the plurality of integrated circuits. The first thermal layer extracts heat from the integrated circuits by direct interface to the bottom metal layer and the second thermal layer extracts heat from an IC interconnect (i.e., a direct solder flip chip attachment or wire bonds).

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Figure 1:
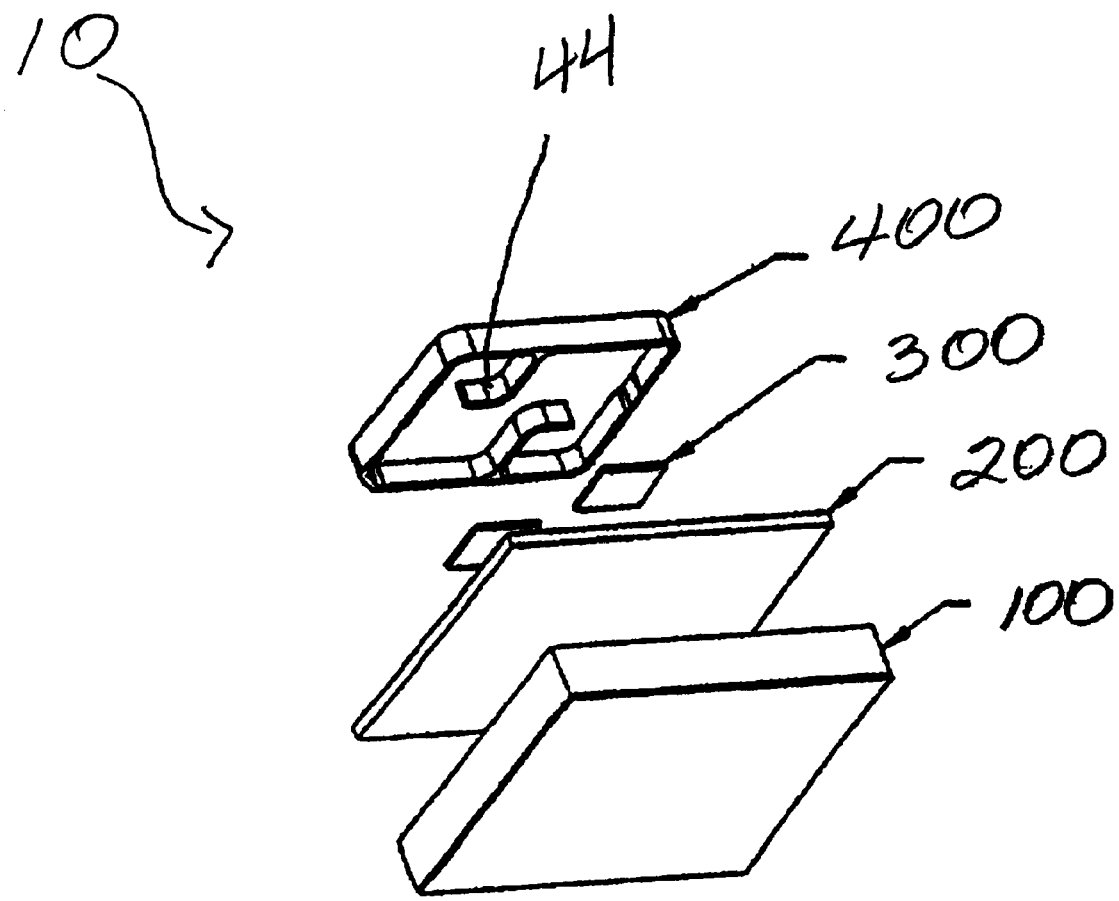
FIG. 1 is a solid state gamma camera module according to a preferred embodiment of the present invention.

The solid state gamma camera module of the present invention is shown in FIG. 1 and referred to by reference numeral 10. Referring to FIG. 1, the solid state gamma camera module 10 of the present invention includes a semiconductor detector material 100 having a temperature sensitive material, a multi-layer printed circuit board (PCB) 200, multiple wire-bonded integrated circuits 300, and a metal cover 400.

The semiconductor detector material 100 can comprise a plurality of detector modules arranged in a two-dimensional array for imaging a radiation field, such as gamma ray radiation emanating from a patient who has been injected with or ingested a radiopharmaceutical. In the preferred embodiment, the detector material 100 is made of cadmium zinc telluride (CZT) material and electrically communicates with the PCB 200.

Figure 2:
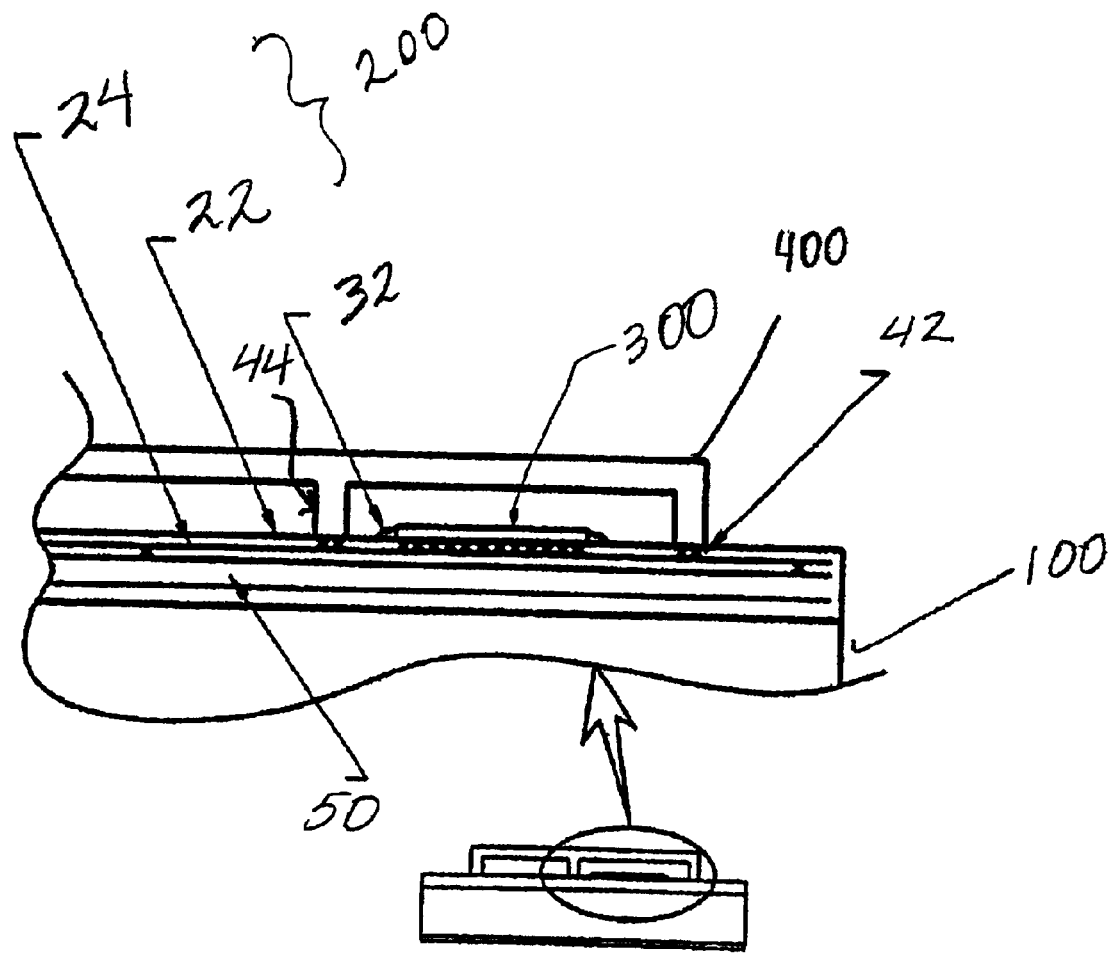
FIG. 2 is a perspective view of a portion of the solid state gamma camera module according to the preferred embodiment of the present invention.

As illustrated in FIG. 2, the PCB 200 comprises an external metal thermal layer 22 and an internal metal thermal layer 24. The external thermal layer 22 is thermally and/or electrically bonded to the internal thermal layer 24. A thick insulating layer 50 is formed between the PCB 200 and the semiconductor detector material 100, such that the thermal layers 22, 24 are thermally isolated from the semiconductor detector material 100. The insulating layer 50 can be made of any insulating material that thermally isolates the thermal layers from the semiconductor detector material as may be known in the art.

In the preferred embodiment, the integrated circuits 300 can be connected to the PCB 200 by an integrated circuit (IC) interconnect such as a wire bond or a die bond. An example of a die bonding process will now be described. A chip is first mounted solidly on a metal lead frame (bottom metal layer) or on a metallized region in a package. A thin layer of gold (Au) is placed between the bottom of the chip and a substrate. Heat and a slight scrubbing motion are applied such that an alloyed bond is formed, which holds the chip firmly to the substrate. Once the chip is mounted, the interconnection wires are attached from various contact pads (on the periphery of the chip) to posts (or PCB pads) on a lead frame (of the package). Other types of bonding that are well known in the art can also be used.

The external thermal layer 22 extracts heat from the integrated circuits 300 by direct interface to the bottom metal layer (not shown) and the internal thermal layer 24 extracts heat from the wire bonds 32 by extension of the bond pads under the wire bonds to the internal thermal layer 24. Accordingly, a low thermal resistance path between the integrated circuits 300 and a heat-sink interface is formed while the heat conduction path to the temperature sensitive CZT material (of the semiconductor detector material 100) is reduced by providing the insulation layer 50.

The metal cover 400 is electrically and thermally bonded via connections 42 to the PCB 200. Electrical shielding and integrated circuit bulk bias are provided to the external thermal layer 22, which a negative low impedance bias is applied. The metal cover 400 and the PCB 200 form a shielded semi-hermetic package. The internal cover structures 44 of the metal cover 400 provide a thermal interface point to the external thermal layer 22 in the vicinity of the interior wire bonds 32. The wire bonds 32 and the external thermal layer 22 are free from conformal materials, such that strays and leakage are minimized. In addition, the metal cover 400 provides a heat-sink thermal interface point.

In an alternative embodiment, the integrated circuits 300 can be connected to the PCB 200 by an IC interconnect such as a direct solder flip chip attachment (not shown). The integrated circuits 300 are mounted to the external thermal layer 22. The back of the integrated circuits 300 serves as a substrate, and the internal thermal layer 24 serves as a direct thermal path to external thermal layer 22. External connecting terminals for directly connecting bond pads (not shown) of the integrated circuits 300 are formed on bond pads (not shown) of the external thermal layer 22. The external connecting terminals may be formed using a solder coat, solder balls or the like.

The external thermal layer 22 extracts heat from the integrated circuits 300 directly, or through the internal thermal layer 24, and the internal thermal layer 24 extracts heat from the direct solder flip chip attachment. Accordingly, a low thermal resistance path between the integrated circuits 300 and the thermal layers is formed while the heat conduction path to the temperature sensitive CZT material is reduced.

Figure 3:
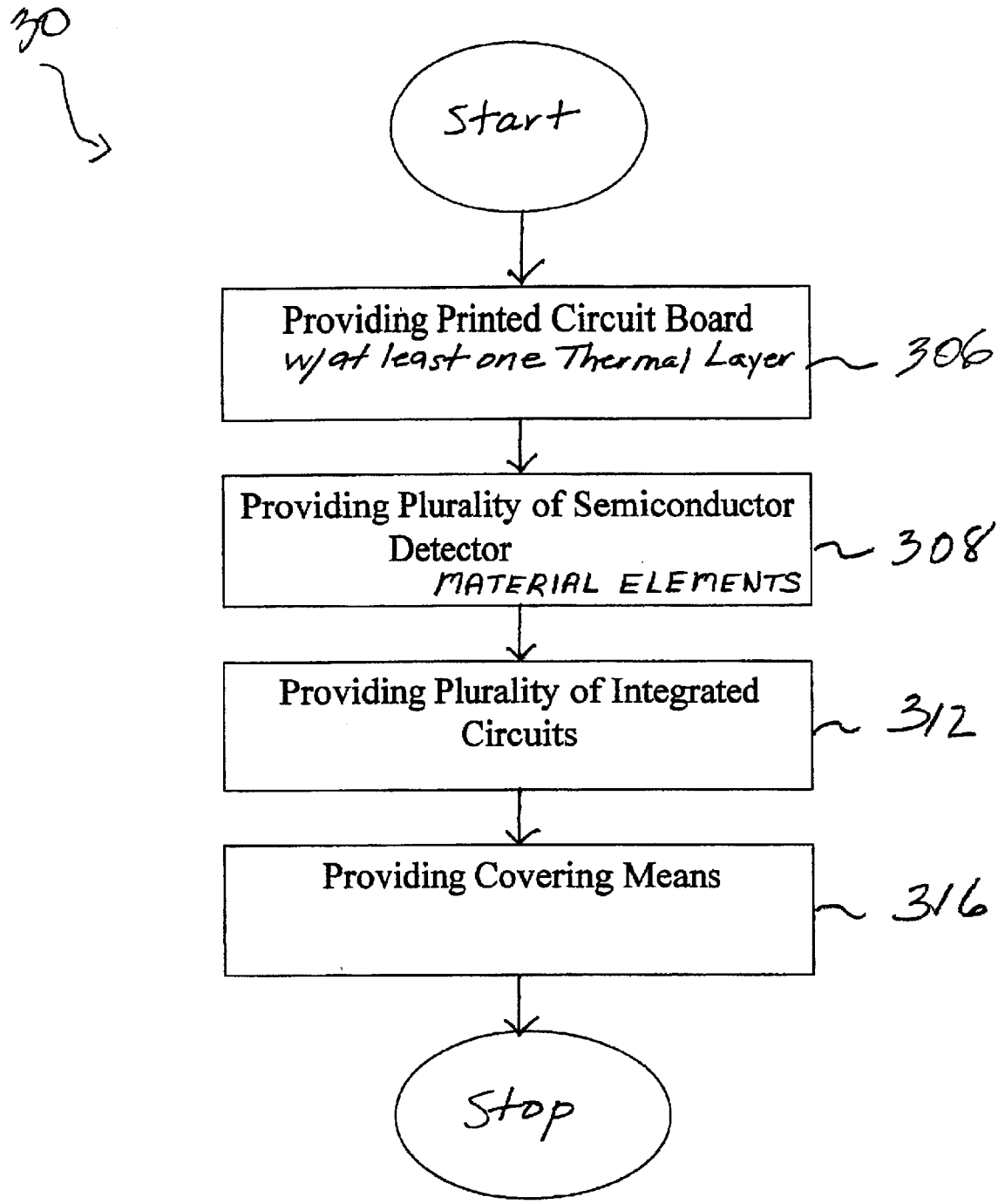
FIG. 3 is a flow chart of one method embodiment for reducing heat generated by integrated circuits while reducing heat flow to temperature sensitive material.

FIG. 3 is a flow chart 30 for reducing heat generated by the integrated circuits 300 connected to one side of the PCB 200 while reducing heat flow to temperature sensitive CZT material (of the semiconductor detector material 100) attached to the other side of the PCB 200. In step 306, a multi-layer printed circuit board is provided with an external thermal layer and an internal thermal layer. The external thermal layer is thermally and/or electrically bonded to the internal thermal layer.

In step 308, a semiconductor detector module having the temperature sensitive material is provided. The detector module electrically communicates with the internal thermal layer.

In step 312, a plurality of integrated circuits are electrically connected to the external thermal layer, and in step 316, a metal cover electrically and thermally bonded to the external thermal layer is provided. The metal cover covers the plurality of integrated circuits.

Therefore, the integrated thermal management method allows the external thermal layer to extract heat from the integrated circuits and the internal thermal layer to extract heat from the IC interconnect, such as wire bonds, die bonds or a direct solder flip chip attachment. Inasmuch, heat generated by the integrated circuits is removed while heat flow to the temperature sensitive material is reduced.

While the invention has been described in detail above, the invention is not intended to be limited to the specific embodiments as described. It is evident that those skilled in the art may now make numerous uses and modifications of and departures from the specific embodiments described herein without departing from the inventive concepts. Any and all such modifications are intended to be included within the scope of the following claims.

What is claimed is:

1. A solid state gamma camera module for providing a low thermal resistance path between integrated circuits and a heat sink interface while reducing a heat conduction path to temperature sensitive material, comprising:
   a printed circuit board having a first thermal layer and a second thermal layer, said first thermal layer being thermally and/or electrically bonded to said second thermal layer;
   a semiconductor detector module having said temperature sensitive material operable to electrically communicate with said second thermal layer;
   a plurality of said integrated circuits each having a bottom metal layer and wire bonds, said integrated circuits being electrically connected to said first thermal layer; and
   covering means electrically and thermally bonded to said first thermal layer and operable to cover said plurality of integrated circuits,
   wherein said first thermal layer extracts heat from said integrated circuits by direct interface to said bottom metal layer and said second thermal layer extracts heat from an integrated circuit interconnect.

2. The camera module of claim 1, wherein said temperature sensitive material is cadmium zinc telluride.

3. The camera module of claim 1, further comprising an insulating layer disposed between said detector module and said printed circuit board.

4. The camera module of claim 1, wherein said covering means comprises internal structuring means operable to provide a thermal interface point to said first thermal layer.

5. The camera module of claim 1, wherein said covering means and said printed circuit board form a thermal metal layer.

6. The camera module of claim 1, wherein said integrated circuit interconnect is through at least one of said wire bonds and die bonds.

7. A solid state gamma camera module for providing a low thermal resistance path between integrated circuits and a heat sink interface while reducing a heat conduction path to temperature sensitive material, comprising:
   a printed circuit board having a first thermal layer and a second thermal layer, said first thermal layer being thermally and/or electrically bonded to said second thermal layer;
   a semiconductor detector module having said temperature sensitive material operable to electrically connect with said second thermal layer;
   a plurality of said integrated circuits being electrically connected to said first thermal layer; and
   covering means electrically and thermally bonded to said first thermal layer and operable to cover said plurality of integrated circuits,
   wherein said first thermal layer extracts heat from said integrated circuits through said second thermal layer and said second thermal layer extracts heat from an integrated circuit interconnect.

8. The camera module of claim 7, wherein said temperature sensitive material is cadmium zinc telluride.

9. The camera module of claim 7, wherein said integrated circuit interconnect is through a direct solder flip chip attachment.

10. The camera module of claim 7, wherein said second thermal layer serves as a thermal path to said first thermal layer.

11. The camera module of claim 7, wherein said integrated circuit interconnect is through external connecting terminals.

12. The camera module of claim 11, wherein said external connecting terminals are solder coats or solder balls.

13. An integrated thermal management method for providing a low thermal resistance path between integrated circuits and a heat sink interface while reducing a heat conduction path to temperature sensitive material, comprising the steps of:
   providing a printed circuit board with a first thermal layer and a second thermal layer, said first thermal layer thermally and/or electrically bonded to said second thermal layer;
   providing a semiconductor detector module with said temperature sensitive material operable to electrically communicate with said second thermal layer;
   providing a plurality of said integrated circuits with a bottom metal layer and wire bonds, said integrated circuits being electrically connected to said first thermal layer; and
   providing covering means electrically and thermally bonded to said first thermal layer, with said covering means covering said plurality of integrated circuits,
   wherein said first thermal layer extracts heat from said integrated circuits by direct interface to said bottom metal layer and said second thermal layer extracts heat from an integrated circuit interconnect.

14. The method of claim 13, wherein said temperature sensitive material is cadmium zinc telluride.

15. The method of claim 13, further comprising the step of providing an insulating layer between said detector module and said printed circuit board.

16. The method of claim 13, wherein said covering means comprises internal structuring means operable to provide a thermal interface point to said first thermal layer.

17. The method of claim 13, wherein said covering means and said printed circuit board form a thermal metal layer.

18. The method of claim 13, wherein said integrated circuit interconnect is through said wire bonds.

19. An integrated thermal management method for providing a low thermal resistance path between integrated circuits and a heat sink interface while reducing a heat conduction path to temperature sensitive material, comprising the steps of:

providing a printed circuit board with a first thermal layer and a second thermal layer, said first thermal layer thermally and/or electrically bonded to said second thermal layer;

providing a semiconductor detector module with said temperature sensitive material operable to electrically communicate with said second thermal layer;

providing a plurality of said integrated circuits electrically connected to said first thermal layer; and providing covering means electrically and thermally bonded to said first thermal layer, with said covering means covering said plurality of integrated circuits, wherein said first thermal layer extracts heat from said integrated circuits through said second thermal layer and said second thermal layer extracts heat from an integrated circuit interconnect.

20. The method of claim 19, wherein said temperature sensitive material is cadmium zinc telluride.

21. The method of claim 19, wherein said integrated circuit interconnect is through a direct solder flip chip attachment.

22. The method of claim 19, wherein said second thermal layer serves as a thermal path to said first thermal layer.

23. The method of claim 19, wherein said integrated circuit interconnect is through external connecting terminals.

24. The method of claim 23, wherein said external connecting terminals are solder coats or solder balls.

* * * * *